US008822000B2

(12) United States Patent
Kumagai et al.

(10) Patent No.: US 8,822,000 B2
(45) Date of Patent: Sep. 2, 2014

(54) NANOSTRUCTURE AND METHOD FOR MANUFACTURING THE SAME

(75) Inventors: Hironori Kumagai, Osaka (JP); Yasuhiro Hashimoto, Nara (JP); Shigeo Hayashi, Kyoto (JP); Takuma Asari, Hyogo (JP); Toshiya Yokogawa, Nara (JP)

(73) Assignee: Panasonic Corporation, Osaka (JP)

( * ) Notice: Subject to any disclaimer, the term of this patent is extended or adjusted under 35 U.S.C. 154(b) by 1217 days.

(21) Appl. No.: 12/520,959

(22) PCT Filed: Jan. 16, 2008

(86) PCT No.: PCT/JP2008/050398
§ 371 (c)(1),
(2), (4) Date: Jun. 23, 2009

(87) PCT Pub. No.: WO2008/087957
PCT Pub. Date: Jul. 24, 2008

(65) Prior Publication Data
US 2009/0317597 A1 Dec. 24, 2009

(30) Foreign Application Priority Data

Jan. 18, 2007 (JP) ................................. 2007-008724

(51) Int. Cl.
*H01M 4/583* (2010.01)
*H01M 10/04* (2006.01)
(Continued)

(52) U.S. Cl.
CPC ............... *C25D 11/02* (2013.01); *C25D 11/04* (2013.01); *B01J 35/006* (2013.01); *B01J 23/745* (2013.01); *B01J 37/0226* (2013.01); *B82Y 30/00* (2013.01); *B01J 37/0244* (2013.01); *B01J 23/8906* (2013.01)
USPC ...... 428/35.7; 429/245; 429/231.8; 29/623.1; 29/623.5; 29/25.03

(58) Field of Classification Search
USPC .......................... 313/310, 311, 495; 428/35.7
See application file for complete search history.

(56) References Cited

U.S. PATENT DOCUMENTS 6,146,227 A * 11/2000 Mancevski ...................... 445/24
6,628,053 B1 9/2003 Den et al.
(Continued)

FOREIGN PATENT DOCUMENTS

JP 11-194134 7/1999
JP 2003-073859 3/2003
(Continued)

OTHER PUBLICATIONS

Riichiro Saito et al., "Fundamentals and Applications of Carbon Nanotubes," Mar. 2004, Baifukan Co., Ltd., pp. 23-40, and pp. 269-278.

*Primary Examiner* — Ellen S Raudenbush
(74) *Attorney, Agent, or Firm* — McDermott Will & Emery LLP

(57) ABSTRACT

The present invention provides a nanostructure on an upper surface of which a small-diameter carbon nanotube (CNT) is formed and which improves an adhesive strength between a substrate and the CNT while controlling an orientation of the CNT, and a method for manufacturing the nanostructure. The nanostructure includes a substrate 101, a porous layer 102 formed on the substrate 101 to have a fine pore, a fine pore diameter control layer 103 formed on the porous layer 102, and a carbon nanotube 701 formed to extend from the fine pore defined by the fine pore diameter control layer 103, and one end of the carbon nanotube is fixed by the fine pore diameter control layer 103. It is preferable that the substrate 101 and the fine pore diameter control layer 103 be electrically conductive. It is preferable that the porous layer 102 be an anode oxide film. It is preferable that a melting point of the fine pore diameter control layer 103 be 600° C. or higher.

15 Claims, 11 Drawing Sheets

(51) Int. Cl.
*B05D 3/00* (2006.01)
*B01J 35/00* (2006.01)
*B01J 23/745* (2006.01)
*B01J 37/02* (2006.01)
*B82Y 30/00* (2011.01)
*C25D 11/02* (2006.01)
*C25D 11/04* (2006.01)
*B01J 23/89* (2006.01)

(56) References Cited

U.S. PATENT DOCUMENTS

| | | | |
|---|---|---|---|
| 6,720,728 | B2 | 4/2004 | Den et al. |
| 7,011,771 | B2 * | 3/2006 | Gao et al. ............... 252/502 |
| 2004/0116034 | A1 | 6/2004 | Den et al. |
| 2006/0033415 | A1 | 2/2006 | Den et al. |
| 2006/0119015 | A1 * | 6/2006 | Wehrspohn et al. ....... 264/627 |

FOREIGN PATENT DOCUMENTS

| | | |
|---|---|---|
| JP | 2003-335509 | 11/2003 |
| JP | 2005-105409 | 4/2005 |
| JP | 2006-130601 | 5/2006 |
| JP | 2007-076925 | 3/2007 |

* cited by examiner (a)

FIG.8
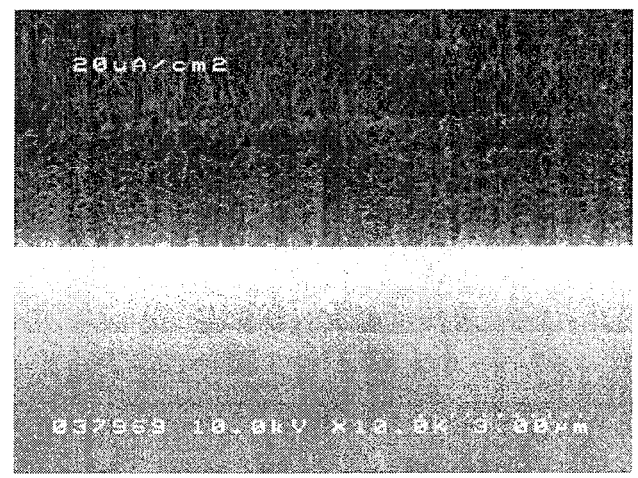
Fig.8-1
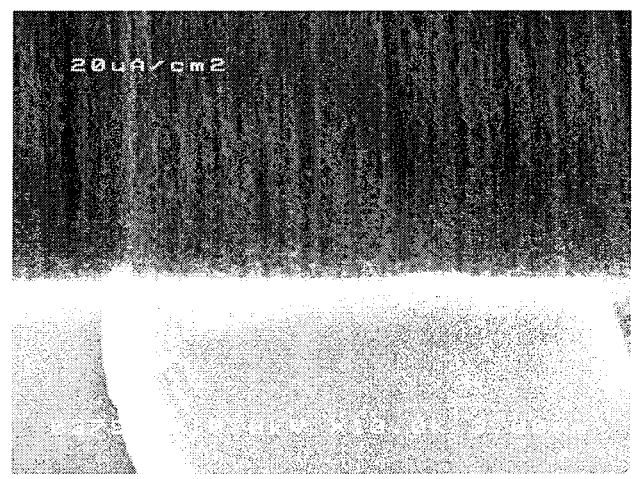
Fig.8-2

FIG.9
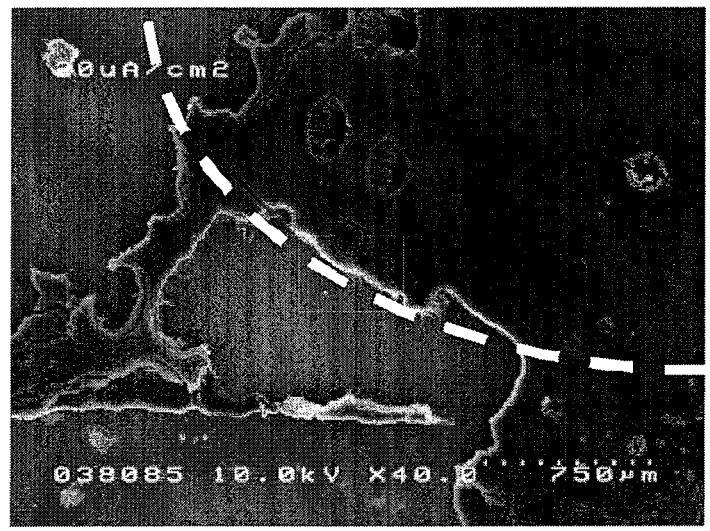
Fig.9-1
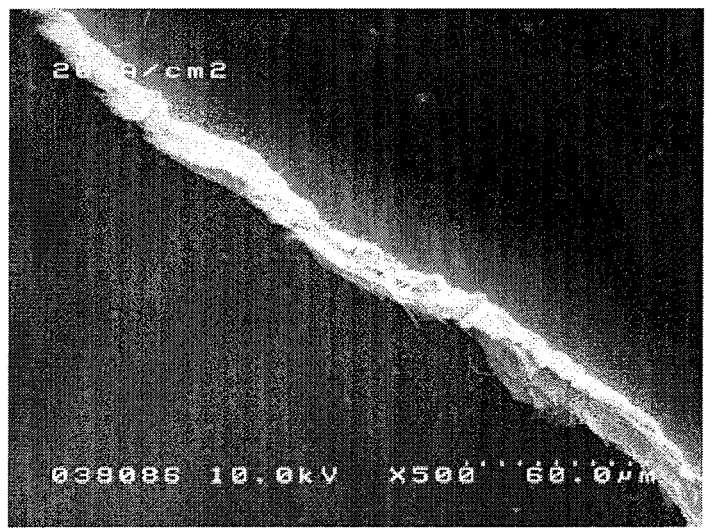
Fig.9-2

FIG.10
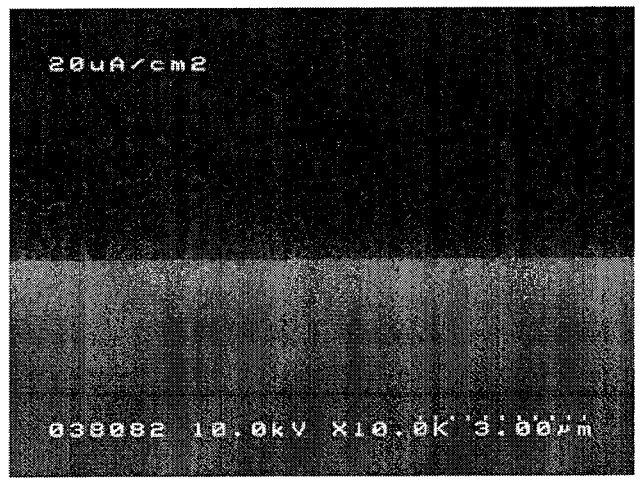
Fig.10-1
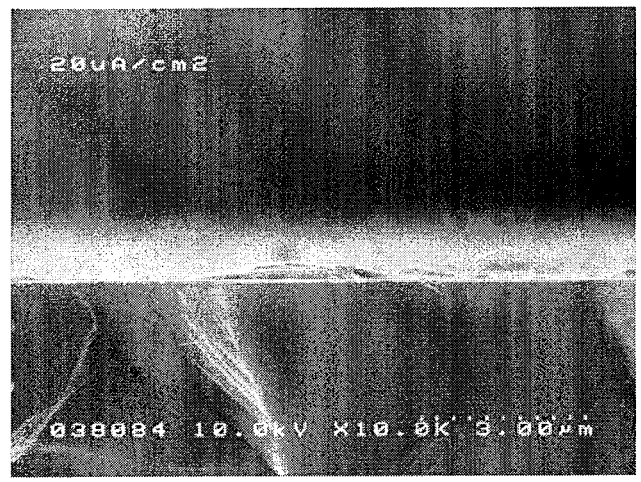
Fig.10-2

NANOSTRUCTURE AND METHOD FOR MANUFACTURING THE SAME

RELATED APPLICATIONS

This application is the U.S. National Phase under 35 U.S.C. §371 of International Application No. PCT/JP2008/050398, filed on Jan. 16, 2008, which in turn claims the benefit of Japanese Application No. 2007-008724, filed on Jan. 18, 2007, the disclosures of which Applications are incorporated by reference herein.

TECHNICAL FIELD

The present invention relates to a nanostructure in which one end of a carbon nanotube is fixed on a substrate, and a method for manufacturing the nanostructure.

BACKGROUND ART

A carbon nanotube (hereinafter may be referred to as "CNT") is a material having a structure formed by rolling in a tube shape a graphene sheet in which carbon atoms are arranged in a hexagonal, mesh-like pattern. Since the carbon nanotube has a large surface area, an extremely strong mechanical property, an excellent electronic property, and the like, it is expected to be applied to various fields. As the CNT, there are a single-wall CNT formed by rolling one graphene sheet and a multi-wall CNT formed by rolling a plurality of graphene sheets. The CNTs show different properties depending on whether the CNT is the single-wall CNT or the multi-wall CNT, and chirality which changes by how the graphene sheet is rolled. It is known that the CNT shows semiconductivity or metallicity depending on the chirality, and a ratio of the CNTs showing the semiconductivity to the CNTs showing the metallicity is 2:1. As described above, the chirality depends on how the graphene sheet is rolled, and relates to the diameter of the CNT. Therefore, controlling the diameter of the CNT leads to controlling the property of the CNT, so that controlling the diameter of the CNT is extremely important when synthesizing the CNT.

In general, as methods for synthesizing the CNT, there are (1) Arc Discharge, (2) Laser Vaporization, and (3) Chemical Vapor Deposition (hereinafter referred to as "CVD") (see Nonpatent Document 1, page 23 to 40 for example). As the CVD, there are a thermal CVD for thermally decomposing a material gas and a plasma CVD for decomposing the material gas by plasma. The outline, advantages, and disadvantages of each synthesizing method are as follows.

Arc Discharge is a method for synthesizing the CNT by carrying out an arc discharge using a carbon rod as an electrode in a vacuum or in an inactive gas atmosphere. Arc Discharge has the advantage that the crystallinity of a graphite layer of the CNT obtained by Arc Discharge is excellent, and the disadvantage that the amount of impurities, such as amorphous carbon, of the CNT obtained by Arc Discharge is large.

Laser Vaporization is a method for synthesizing the CNT in a process of sublimating carbon by irradiating a carbon rod with laser in an atmosphere of a noble gas, such as argon. The single-wall CNT can be selectively obtained by using Laser Vaporization. Laser Vaporization has the advantages that the crystallinity of the single-wall CNT obtained by Laser Vaporization is excellent and it is useful for finding out the mechanism of synthesizing the nanotube, and the disadvantages that the amount of synthesis is small, it does not suit for mass-production, and the multi-wall CNT cannot be synthesized.

The CVD is a method for synthesizing the CNT by supplying as a carbon source a hydrocarbon gas, such as methane or acetylene, or an alcohol, such as methanol, to a chamber and directly decomposing the carbon source on a substrate mounting catalyst particles. As described above, there are two major types of the CVD, the thermal CVD and the plasma CVD. The CVD has the advantages that, for example, the purity of the CNT is high, it is suitable for industry since it can realize mass-production, and it can synthesize the CNT directly on the substrate. Further, the CVD has the advantage that since the CNT is synthesized using the catalyst particles on the substrate, the diameter of the CNT can be arbitrarily controlled by controlling the diameter of the catalyst particle. The CVD has the disadvantage that, for example, the crystallinity of the multi-wall CNT is low.

Among the above three methods, only the CVD can directly synthesize the CNT on the substrate. If the CNT can be directly synthesized on the substrate, devices can be directly manufactured, such as synthesizing the CNT on an integrated circuit. Therefore, the CVD using the catalyst particles has been attracting attention.

To directly synthesize the CNT on the substrate, catalyst metal particles need to be formed on the substrate. A general method for forming the catalyst metal particles are deposition of catalyst metal and a method using catalyst metal colloidal particles. How to deposit the catalyst metal and optimization of the diameter of the catalyst metal particle are important factors in synthesizing the CNT, and various known-howl are required.

In the synthesis by the CVD, a CVD process is carried out after the catalyst metal particles are formed. In many cases, the temperature of the CVD process is high, such as 600° C. or higher. In this case, a problem arises where the catalyst metal particles formed on the substrate agglomerate by heat of the synthesis of the CNT. It is generally known that the diameter of the CNT becomes the diameter of the catalyst metal particle. Therefore, if the catalyst metal particle increases in diameter by the agglomeration, the CNT also increases in diameter.

To prevent the agglomeration of the catalyst metal particles, a method using the substrate mounting a catalyst supporting material is known. This method is a technology which prevents the agglomeration of the catalyst metal particles by placing the catalyst metal in nanopores of the catalyst supporting material, keeps small diameters of the catalyst particles, and thus synthesizes the CNTs having small diameters. In Patent Document 1 for example, zeolite is used as the catalyst supporting material. Zeolite is a material having a plurality of fine through holes. By placing the catalyst metal at the bottom of the through holes of the zeolite layer, the agglomeration of the catalyst metal particles in the CVD process is prevented, and the CNTs having small diameters are synthesized.

Further, Nonpatent Document 1 describes on page 269 to 278 that an aluminum anode oxide film is used as a die of the CNT synthesis.

Moreover, when directly synthesizing the CNT on the substrate, an adhesive strength between the substrate and the CNT depends mainly on a contact point between the substrate and the CNT or a contact point between the substrate and the catalyst.

Normally, the diameter of the CNT and the diameter of the catalyst are on the order of nanometers, and the adhesion is maintained only by an area formed by the diameter of nanometers. Therefore, the adhesive strength between the substrate and the CNT is low in many cases, and peeling of the CNT after synthesizing the CNT becomes a problem in many cases.

Patent Document 1: Japanese Laid-Open Patent Application Publication 2003-335509

Nonpatent Document 1: "Fundamentals and Applications of Carbon Nanotubes" written by Riichiro Saito and Hisanori Shinohara and published on March, 2004 by BAIFUKAN CO., LTD

DISCLOSURE OF THE INVENTION

Problems to be Solved by the Invention

By using the method described in Patent Document 1, the agglomeration of the catalyst metal particles can be prevented, and the CNT having the small diameter can be synthesized. However, in this case, the diameter of the synthesized CNT is uniformly determined by the diameter of the through hole of the zeolite that is the catalyst supporting material. Therefore, the CNTs of various diameters cannot be arbitrarily, efficiently synthesized.

Moreover, although it is easy to control the diameter of the fine pore of the aluminum anode oxide film, the diameter of the fine pore can be generally controlled only within a range of 10 nm or more. Therefore, if the aluminum anode oxide film is used as the catalyst supporting material, only the CNT having the diameter of 10 nm or more is synthesized, and it is difficult to synthesize the CNT having the diameter of less than 10 nm.

Moreover, in the case of increasing the adhesive strength between the substrate and the CNT when the CNTs are directly synthesized on the substrate, the orientations of the CNTs tend to be random. Controlling the orientations of the CNTs is necessary in view of the application to devices. Therefore, there is a need for a method for controlling the orientations of the CNTs while improving the adhesive strength between the substrate and the CNT.

Moreover, it is desired that a resistance between the substrate and the CNT be low when the CNT directly synthesized on the substrate is used as a device. However, since the diameter of the CNT is on the order of nanometers as described above, the cross-sectional area of a contact portion between the CNT and the substrate is significantly small, and a portion which may be the contact point between the substrate and the CNT is locally oxidized. Therefore, there has been a concern that the resistance between the substrate and the CNT becomes high. On this account, there is a need for a technology of reducing the resistance between the substrate and the CNT as small as possible.

In consideration of the above current situations, an object of the present invention is to provide a nanostructure on an upper surface of which a carbon nanotube having a small diameter is highly-controllably and efficiently formed, and a method for manufacturing the nanostructure.

Another object of the present invention is to provide a nanostructure in which the adhesive strength between the substrate and the CNT is improved while controlling the orientation of the CNT, and a method for manufacturing the nanostructure.

Still another object of the present invention is to provide a nanostructure capable of reducing the resistance between the substrate and the CNT, and a method for manufacturing the nanostructure.

Means for Solving the Problems

The present invention was made to solve the above problem, and a nanostructure of the present invention includes: a substrate; a porous layer formed on the substrate to have a fine pore; a fine pore diameter control layer formed on the porous layer; and a carbon nanotube formed to extend from the fine pore defined by the fine pore diameter control layer, wherein one end of the carbon nanotube is fixed by the fine pore diameter control layer.

It is preferable that the substrate be electrically conductive. With this configuration, direct electrical conduction between the substrate and the catalyst is realized, so that the nanostructure of the present invention can be applied to devices and the like.

It is preferable that the fine pore of the porous layer be oriented in a predetermined direction with respect to the substrate. With this configuration, it becomes easy to form the fine pore diameter control layer on the porous layer.

It is preferable that the predetermined direction be perpendicular to the substrate. With this configuration, it becomes easier to form the fine pore diameter control layer. Herein, the term "perpendicular" is not limited to "completely perpendicular", and includes a certain inclination (up to about 20 degrees for example) with respect to the direction perpendicular to the substrate.

It is preferable that the porous layer be an anode oxide film. With this configuration, the fine pore can be formed to be preferably oriented. For example, if zeolite particles are used, the porous layer constituted by a zeolite film can be formed. However, in this case, the directions of the fine pores in the particles are random, so that it is difficult of form the fine pore oriented preferably. As described above, the oriented fine pore is advantageous in a stage of forming the fine pore diameter control layer.

It is preferable that a melting point of the porous layer be higher than a melting point of the fine pore diameter control layer. With this configuration, when fixing one end of the carbon nanotube by the fine pore diameter control layer, only the fine pore diameter control layer can be melted without melting the porous layer. Therefore, it is possible to maintain the original orientation of the carbon nanotube.

It is preferable that the melting point of the fine pore diameter control layer be 600° C. or higher. Generally, the temperature of the synthesis of the CNT is 600° C. or higher. Since the melting point of the fine pore diameter control layer is 600° C. or higher, the fine pore diameter control layer does not change in quality when synthesizing the CNT. Therefore, it is possible to form the nanostructure for highly-controllably synthesizing the small-diameter CNT. It is further preferable that the melting point of the fine pore diameter control layer be equal to or higher than the temperature of the synthesis of the CNT.

It is preferable that the fine pore diameter control layer be electrically conductive. Since the fine pore diameter control layer is electrically conductive, the electric conduction between the CNT and the substrate can be maintained regardless of the positional relation between the substrate and the catalyst. Therefore, the degree of freedom of formation of the fine pore diameter control layer increases, and the production of devices becomes easy.

It is preferable that a degree of oxidation of the fine pore diameter control layer located at a lower portion of a contact portion between the fine pore diameter control layer and the carbon nanotube be lower than the degree of oxidation of the fine pore diameter control layer located at an upper portion of the contact portion. With this configuration, electron transfer between the carbon nanotube and the substrate is carried out through a portion where the degree of oxidation is low, so that it is possible to reduce the electrical resistance of the nanostructure. Regarding the upper portion and the lower portion described above, in a case where two points arranged in the vertical direction of the substrate are selected in the contact portion between the fine pore diameter control layer and the carbon nanotube, a point located on an upper side is the upper portion, and a point located on a lower side (substrate side) is the lower portion. The degree of oxidation of the fine pore diameter control layer can be compared by, for example, a surface condition measurement using XPS or the like, or a crystal structure analysis using TEM or the like.

It is preferable that a material constituting the fine pore diameter control layer get into the carbon nanotube. With this, the contact area between the carbon nanotube and the substrate including the fine pore diameter control layer further increases, so that a joint strength therebetween can further improve, and the resistance between the substrate and the CNT can be further reduced.

Further, the present invention is a method for manufacturing a nanostructure, including the steps of: forming a porous layer on a substrate; forming a fine pore diameter control layer on the porous layer; forming a catalyst in a fine pore defined by the fine pore diameter control layer; forming a carbon nanotube extending from the fine pore defined by the fine pore diameter control layer; and after forming the carbon nanotube, fixing one end of the carbon nanotube by the fine pore diameter control layer by carrying out a heat treatment. With this, it is possible to effectively manufacture the nanostructure in which one end of the small-diameter carbon nanotube is fixed on the substrate. In addition, the adhesive strength between the CNT and the substrate including the fine pore diameter control layer can be increased while controlling the orientation of the CNT.

Further, the present invention is a method for manufacturing a nanostructure, including the steps of: forming a porous layer on a substrate; processing a shape of a fine pore of the porous layer; forming a fine pore diameter control layer on the processed porous layer; forming a catalyst in the fine pore defined by the fine pore diameter control layer; forming a carbon nanotube extending from the fine pore defined by the fine pore diameter control layer; and after forming the carbon nanotube, fixing one end of the carbon nanotube by the fine pore diameter control layer by carrying out a heat treatment. Herein, to facilitate the formation of the desired fine pore diameter control layer, the shape of the fine pore of the porous layer is processed before forming the fine pore diameter control layer. With this, it is possible to facilitate the production of the nanostructure suited for an object of the present invention.

It is preferable that the step of forming the carbon nanotube be carried out under an atmosphere including a reducing gas. With this configuration, since the catalyst, the fine pore diameter control layer, and the like can be reduced when forming the CNT, it is possible to reduce the electrical resistance of the nanostructure.

It is preferable that a temperature of the heat treatment be equal to or higher than a temperature of synthesis of the carbon nanotube. With this, the fine pore diameter control layer does not change when synthesizing the carbon nanotube, but highly-controllably changes in shape at the time of the heat treatment. Thus, it is possible to increase the joint strength between the carbon nanotube and the substrate including the fine pore diameter control layer.

It is preferable that a temperature of the heat treatment be higher than a melting point of the fine pore diameter control layer and lower than a melting point of the porous layer. According to this, at the time of the heat treatment, the fine pore diameter control layer melts, but the porous layer does not melt. Therefore, the orientation of the carbon nanotube before the heat treatment does not change and can be satisfactorily maintained, and the joint strength between the carbon nanotube and the substrate including the fine pore diameter control layer can be improved.

It is preferable that the fixing step be carried out under an atmosphere including a reducing gas. With this configuration, in the heat treatment in the fixing step, the catalyst and the fine pore diameter control layer can be reduced. Therefore, the electrical resistance of the nanostructure can be reduced.

It is preferable that the fixing step be consecutively carried out after the step of forming the carbon nanotube without being exposed to an oxidizing atmosphere. With this configuration, it is possible to avoid the possibility that the fine pore diameter control layer oxidizes. Therefore, the electrical resistance of the nanostructure can be further reduced.

The terms "without being exposed to an oxidizing atmosphere" denotes "without being exposed to an atmosphere which causes the catalyst or the fine pore diameter control layer to oxidize. Since the degree of oxidization changes depending on materials (metal species), temperatures, and the like, no problem occurs as long as the atmosphere is suitable for the above object.

Effects of the Invention

Since the present invention is configured as above, it can provide the nanostructure on the upper surface of which the carbon nanotube having the small diameter is highly-controllably and efficiently formed, and the method for manufacturing the nanostructure. In the present invention, the fine pore diameter control layer is disposed on the porous layer, so that the diameter of the fine pore of the porous layer can be easily adjusted. Therefore, the diameter of the carbon nanotube synthesized using the fine pore as a base point can be easily controlled.

Further, the present invention can increase the joint strength between the carbon nanotube and the substrate including the fine pore diameter control layer while maintaining the orientation of the carbon nanotube. Therefore, in the nanostructure in which one end of the carbon nanotube is fixed on the substrate, the carbon nanotube is unlikely to peel off the substrate while maintaining the orientation of the carbon nanotube. On this account, various devices having high stability can be manufactured using the above nanostructure.

Further, since the present invention can reduce the resistance between the substrate and the carbon nanotube, it is possible to improve characteristics of various devices.

BEST MODE FOR CARRYING OUT THE INVENTION

Hereinafter, embodiments of the present invention will be explained in detail in reference to the drawings.

FIG. 1 are diagrams for explaining differences between a nanostructure (on which the CNT is not formed) of the present invention and a prior art. FIG. 1(a) is a diagram showing the configuration of the present invention, and FIG. 1(b) is a diagram showing the configuration of the prior art. In FIG. 1, reference number 101 denotes a substrate, reference number 102 denotes a porous layer, reference number 103 denotes a fine pore diameter control layer, and reference number 104 denotes a catalyst. As is clear from the drawings, the present invention is characterized by the fine pore diameter control layer. Even in the case of forming the catalyst using the porous layer having a specific fine pore diameter in the present invention and the prior art, the present invention can form catalyst particles having smaller diameters than those of the prior art by the existence of the fine pore diameter control layer. With this, the CNTs having smaller diameters can be highly-controllably synthesized on the substrate.

Embodiment 1

The present embodiment shows a basic mode of the present invention and steps before a step of forming the CNT. Hereinafter, detailed explanations will be made in accordance with a manufacturing process. FIG. 2 shows a flow chart of the present embodiment.

Reference number 201 denotes a substrate preparing step. Any material can be used for the substrate, but an electrically conductive material is preferable. As the material of a typical substrate, Si, $SiO_2$, quartz, aluminum, copper, or the like can be used, but the material of the substrate is not limited to these. In the substrate preparing step, cleavage, cutting, cleaning, and the like of the substrate are carried out. Although the cleavage, cutting, and cleaning of the substrate are arbitrarily carried out, it is preferable to carry out the cleaning. As the cleaning of the substrate, cleaning, such as organic cleaning or acid cleaning, suited for respective situations can be carried out.

Reference number 202 denotes a porous layer forming step. In the porous layer forming step, the porous layer is formed as a catalyst supporting material. As a typical porous layer, there are an anode oxide film and a porous layer made of zeolite, mesoporous silica, alumina, magnesium oxide, or the like. However, the material of the porous layer is not limited to the above materials. As a method for forming the porous layer on the substrate, for example, anodic oxidation is used in the case of the anode oxide film, and an application of each material is used in the case of the porous layers made of the above materials. Various porous layers can be formed depending on how to carry out the anodic oxidation and the application. Moreover, the porous layer can be formed by using a combination of a lithography technology, such as EB exposure, and an etching technology. The thickness of the porous layer is not especially limited as long as it is suitable for the support of the catalyst and the synthesis of the carbon nanotube.

If the density of fine pores of the porous layer is too low, the CNTs may be formed on portions other than the fine pores, and the adhesive strength therebetween deteriorates. Therefore, the density of fine pores of the porous layer is appropriately in a range of about $1 \times 10^{11}$ to $1 \times 10^{13}$ pores/$cm^2$. Moreover, a certain depth of the fine pore of the porous layer is necessary to improve an interface strength between the substrate and the CNT. In contrast, if the fine pore is too deep, it is difficult to manufacture the porous layer, and the CNT in the fine pore does not effectively function. In view of these, the depth of the fine pore of the porous layer is appropriately in a range of about 50 nm to 10 μm.

As the porous layer of the present invention, it is preferable that the porous layer be manufactured such that the fine pores are oriented in a predetermined direction with respect to the substrate, and it is more preferable that the predetermined direction be perpendicular to the substrate. As the porous layer of the present invention, an anode oxide film is preferable, and an aluminum anode oxide film is especially preferable. In the case of the anode oxide film, the fine pores can be regularly formed. The diameter and length (depth) of the fine pore and the density of the fine pores can be easily controlled by adjusting electrolysis conditions at the time of the anodic oxidation. The diameter of the fine pore of the anode oxide film is about 10 to 250 nm, and the length thereof is up to about 100 μm.

A member obtained by integrating the substrate and the porous layer can be used as the substrate. In this case, the porous layer forming step can be omitted.

Reference number 203 denotes a fine pore diameter control layer forming step. The fine pore diameter control layer controls the diameter of the fine pore of the porous layer. Specifically, the fine pore diameter control layer covers the upper surface of the porous layer having the fine pores to reduce the diameter of the fine pore as shown in FIG. 3. A material of the fine pore diameter control layer is not especially limited, but it is preferable to use a material having the melting point of 600° C. or higher. This is to prevent the fine pore diameter control layer from changing in quality in a thermal process, such as the subsequent synthesis of the CNT, or the like. Moreover, it is preferable that the material of the fine pore diameter control layer be an electrically conductive material. Specific examples are metals, such as Pt and Cu. As a method for forming the fine pore diameter control layer, plating, deposition, CVD, or the like can be used. However, the method for forming the fine pore diameter control layer is not limited to these. The thickness of the fine pore diameter control layer needs to be determined by a difference between the diameter of the fine pore of the porous layer and a desired fine pore diameter defined by the fine pore diameter control layer, and is not especially limited.

The diameter of the fine pore defined by providing the fine pore diameter control layer is adjusted in accordance with a desired diameter of the carbon nanotube, and is not especially limited, but may be 1 to 10 nm for example. By adjusting conditions for forming the fine pore diameter control layer, the amount of the material used for the fine pore diameter control layer, and the like, the diameter of the fine pore defined by the fine pore diameter control layer can be easily controlled. Therefore, in the present invention, it is easy to arbitrarily synthesize the CNT having a desired diameter.

The shape of the fine pore diameter control layer is not especially limited as long as the fine pore diameter control layer can achieve its object. For example, as shown in FIG. 3(a), the fine pore diameter control layer may be formed to cover the substrate, or as shown in FIG. 3(b), the fine pore diameter control layer may be formed such that the substrate is exposed.

Reference number 204 denotes a catalyst forming step. In this step, a catalyst metal particle is placed in the fine pore (fine pore whose diameter is reduced) defined by the fine pore diameter control layer, specifically at a bottom portion of the fine pore. As the catalyst, any catalyst can be used as long as it has a catalytic activity in the synthesis of the CNT. Typical materials of the catalyst are Fe, Ni, Co, Cu, Mo, Mn, Zn, Pd, Pt, V, and compounds thereof. However, in the present invention, as the material of the fine pore diameter control layer and the material of the catalyst, different materials need to be combined. As a method for forming the catalyst, vacuum sputtering, chemical vapor deposition, physical vapor deposition, screen printing, electroplating, or the like can be used. However, the method for forming the catalyst is not limited to these.

After the catalyst forming step, a heat treatment may be carried out to fluidize the catalyst formed as above to surely place the catalyst at the bottom portion of the fine pore. By the heat treatment, it becomes easy to realize any catalyst particle diameter, any particle density, and the like.

By the above steps 201 to 204, the nanostructure (on which the CNTs are not formed) of the present embodiment is formed.

Hereinafter, Example regarding the present embodiment will be explained.

Example 1

Used as the substrate is an aluminum substrate. The aluminum substrate is like a foil and has a thickness of 100 μm. The aluminum substrate is cut into 1 cm square pieces, and respective substrates are subjected to the organic cleaning. As the organic cleaning, acetone ultrasound cleaning is carried out for five minutes, and ethanol ultrasound cleaning is carried out for five minutes. Then, ultrasound cleaning using super pure water is carried out for five minutes. After the super pure water cleaning, $N_2$ blow is carried out to dry the substrates.

The dried substrates are taken out and subjected to the anodic oxidation. With this, the porous layer is formed. At this time, the fine pore diameter measured by FE-SEM is 10 nm. The depth of the fine pore is 100 nm.

The substrate subjected to the anodic oxidation is set in an EB deposition device, and the EB deposition is carried out to form the fine pore diameter control layer made of Pt and having a thickness of 4 nm. The degree of vacuum before the deposition is 1E-5Pa. The deposition rate of Pt is 1 angstrom/s. A deposition thickness and a deposition rate are monitored by using a crystal resonator of the EB deposition device. The fine pore diameter measured by the FE-SEM after the deposition of Pt is 2 nm.

After the deposition of Pt, the substrate is again set in the EB deposition device, and the EB deposition is carried out to form a layer using Fe as the catalyst material and having a thickness of 1 nm. The degree of vacuum before the deposition is 1E-5Pa. The deposition rate of Fe is 0.1 angstrom/s. After the deposition of Fe, the substrate is subjected to the heat treatment in a vacuum at 300° C. for 30 minutes. With this, the catalyst particle can be supported in the fine pore defined by Pt that is the fine pore diameter control layer. The diameter of the catalyst particle measured by the FE-SEM is 2 nm.

Embodiment 2

The present embodiment shows a mode of processing the shape of the fine pore before forming the fine pore diameter control layer (Note that the CNTs are not formed).

The fine pore diameter control layer may not be appropriately formed depending on the shape of the fine pore of the porous layer and the method for manufacturing the fine pore diameter control layer. Especially, when the diameter of the fine pore of the porous layer is shorter than the length thereof, i.e., when an aspect ratio (length/diameter) is high, the fine pore diameter control layer suited for an object of the present embodiment cannot be formed in many cases. FIG. 4 show a comparison between a case where the aspect ratio of the fine pore of the porous layer is low and a case where it is high. FIG. 4(a) shows the case where the aspect ratio of the fine pore of the porous layer is low, and FIG. 4(b) shows the case where the aspect ratio of the fine pore of the porous layer is high. FIG. 4(c) shows a case where the fine pore diameter control layer and the catalyst are formed when the aspect ratio is low, and FIG. 4(d) shows a case where the fine pore diameter control layer and the catalyst are formed when the aspect ratio is high. As shown in FIG. 4(d), when the aspect ratio of the fine pore of the porous layer is high, the fine pore of the porous layer is closed by the formation of the fine pore diameter control layer. As a result, there is a possibility that the diameter of the catalyst particle cannot be controlled. Therefore, in the present embodiment, the shape of the fine pore is processed before forming the fine pore diameter control layer.

FIG. 5 shows a flow chart of the present embodiment. A difference between the present embodiment and Embodiment 1 is reference number 501 that is a fine pore shape processing step. Herein, explanations of the same steps as Embodiment 1 are omitted, and only the fine pore shape processing step will be explained.

The fine pore shape processing step is a step of processing the shape of the fine pore of the porous layer. As described above, an object of this step is to prevent the fine pore of the porous layer from being closed by the formation of the fine pore diameter control layer. The processing of the shape of the fine pore denotes processing for lowering the aspect ratio of the fine pore. The aspect ratio of the fine pore can be lowered by, for example, abrading the surface of the porous layer to shorten the length of the fine pore or increasing the diameter of the fine pore of the porous layer. Specific examples of the method for lowering the aspect ratio of the fine pore are ion milling and RIE (Reactive Ion Etching). However, any method can be used as long as it can lower the aspect ratio of the fine pore.

It is preferable that the shape of the fine pore be processed such that the aspect ratio of the fine pore is 10 or lower, although the shape of the fine pore also depends on the subsequent manufacturing process of the fine pore diameter control layer. It is further preferable that the shape of the fine pore be processed such that the aspect ratio of the fine pore is 5 or lower. Especially, in the case of forming the fine pore diameter control layer by the vacuum deposition, a void tends to be generated if the aspect ratio is high, and the formation of the catalyst becomes difficult. In the case of forming the fine pore diameter control layer by the CVD, coverage at the time of the deposition is good. Therefore, as compared to the vacuum deposition, the formation of the catalyst can be carried out even if the aspect ratio is high.

Hereinafter, Example regarding Embodiment 2 will be explained.

Example 2

Used as the substrate is the same aluminum substrate as Embodiment 1. The aluminum substrate is cut into 1 cm square pieces, and respective substrates are subjected to the organic cleaning. As the organic cleaning, the acetone ultrasound cleaning is carried out for five minutes, and the ethanol ultrasound cleaning is carried out for five minutes. Then, the ultrasound cleaning using the super pure water is carried out for five minutes. After the super pure water cleaning, the $N_2$ blow is carried out to dry the substrates.

The dried substrates are taken out and subjected to the anodic oxidation. With this, the porous layer is formed. At this time, the fine pore diameter measured by the FE-SEM is 10 nm. The depth of the fine pore is 1 μm. At this time, the aspect ratio (depth/diameter) of the fine pore is 100.

A part of the substrates subjected to the anodic oxidation are etched by the ion milling. The fine pore diameter measured by the FE-SEM after the ion milling is 15 nm, i.e., is slightly expanded. The depth of the fine pore is 120 nm. At this time, the aspect ratio of the fine pore is 8.

Both the substrate subjected to the anodic oxidation and the substrate subjected to the ion milling are set in the EB deposition device, and subjected to the EB deposition such that the fine pore diameter control layer made of Pt is formed to have a thickness of 4 nm. The degree of vacuum before the deposition is 1E-5Pa. The deposition rate of Pt is 1 angstrom/s. The deposition thickness and the deposition rate are monitored by using a crystal resonator of a vacuum deposition device. The fine pore diameter after the deposition of Pt is measured by the FE-SEM. The fine pore of the substrate which is not subjected to the ion milling is closed. It is thought that the fine pore is closed since the aspect ratio of the fine pore is high and the fine pore diameter control layer is not appropriately formed. The diameter of the fine pore of the substrate subjected to the ion milling is 7 nm.

After the deposition of Pt, the sample is again set in the vacuum deposition device, and subjected to the EB deposition such that a layer made of Fe as the catalyst material is formed to have a thickness of 1 nm. The degree of vacuum before the deposition is 1E-5Pa. The deposition rate of Fe is 0.1 angstrom/s. After the deposition of Fe, the substrate is subjected to the heat treatment in a vacuum at 300° C. for 30 minutes. With this, the substrate subjected to the ion milling can support the catalyst in the fine pore defined by Pt that is the fine pore diameter control layer. The diameter of the catalyst particle measured by the FE-SEM is 7 nm.

Embodiment 3

The present embodiment shows a mode of synthesizing the carbon nanotube using the nanostructure manufactured in Embodiment 1 and carries out the heat treatment after the synthesis of the CNT.

FIG. 6 is a flow chart of the present embodiment. Differences between the present embodiment and Embodiment 1 are reference number 601 that is a carbon nanotube synthesizing step and reference number 602 that is a heat treatment step. Herein, explanations of the same steps as Embodiment 1 are omitted, and only the carbon nanotube synthesizing step and the heat treatment step will be explained. The flow chart of FIG. 6 does not include the fine pore shape processing step 501, but the present embodiment may include the fine pore shape processing step.

Reference number 601 denotes the carbon nanotube synthesizing step. In this step, the CNT is synthesized using the nanostructure manufactured in Embodiment 1 or 2. The thermal CVD, the plasma CVD, or the like can be used as the synthesizing method. Since the CNT is synthesized using as a base point the catalyst metal particle in the fine pore defined by the fine pore diameter control layer, it is preferable to use the CVD. However, any method can be used as long as it can achieve an object of the present embodiment. As the carbon source, a hydrocarbon gas, such as methane, ethylene, or acetylene, an alcohol, such as methanol or ethanol, or carbon monoxide can be used. In addition to the carbon source, an inactive gas, such as argon, is generally used as the carrier gas in the synthesis. It is further preferable to use as the carrier gas a reducing gas or a mixture gas containing the reducing gas, since the reduction of the catalyst particle and the fine pore diameter control layer can be expected. After the synthesis of the CNT, the catalyst metal particle may be located at the tip end of the CNT or may be supported by the bottom portion of the fine pore.

Reference number 602 denotes the heat treatment step. The CNT synthesized on the substrate can be used as a device. However, if the CNT synthesized on a predetermined location peels off the substrate, an original object of the present embodiment cannot be achieved. Therefore, to prevent the CNT from peeling off the substrate, it is preferable to increase the joint strength between the substrate and the CNT. On this account, in the present embodiment, the heat treatment is carried out after the synthesis of the CNT to increase the joint strength between the substrate including the fine pore diameter control layer and the CNT. It is preferable that the heat treatment be carried out in an atmosphere containing the reducing gas. It is further preferable that the carbon nanotube forming step and the heat treatment step be consecutively carried out without causing the CNT to be subjected to an oxidizing atmosphere. By the heat treatment in the atmosphere containing the reducing gas, the reduction of the catalyst and the fine pore diameter control layer is expected. When the fine pore diameter control layer is melted, the upper portion of the fine pore may be capped by the fine pore diameter control layer. With this, the degree of oxidation of the fine pore diameter control layer located at a lower portion of a contact portion between the fine pore diameter control layer and the carbon nanotube may be lower than the degree of oxidation of the fine pore diameter control layer located at an upper portion of the contact portion. Therefore, it is possible to prevent the oxidation at the lower portion of the fine pore when the fine pore diameter control layer is exposed to the atmosphere after it is melted. On this account, the resistance between the carbon nanotube and the substrate can be reduced.

FIG. 7 show a comparison between a case where the heat treatment is not carried out and a case where the heat treatment is carried out. FIG. 7(a) shows the case where the heat treatment is not carried out, and FIG. 7(b) shows the case where the heat treatment is carried out. Reference number 701 denotes the synthesized CNT. Reference number 702 denotes the fine pore diameter control layer which surrounds the CNT and rises along the periphery of the CNT to fix the CNT. In this step, the heat treatment is carried out under an optimal temperature condition, specifically at a temperature equal to or higher than a melting temperature of the fine pore diameter control layer to melt the metal material of the fine pore diameter control layer. A part of the fluidized metal material is directly adhered to the CNT, gets into the CNT, or rises along the periphery of the CNT due to the surface tension shown in FIG. 7(b). In this state, the metal material is cooled down to be solidified. Thus, the fine pore diameter control layer fixes one end of the CNT. This increases the contact area between the CNT and the substrate including the fine pore diameter control layer to improve the joint strength therebetween.

Since the lower portion of the CNT has openings, the fine pore diameter control layer may get into the CNT when it is melted. Further, depending on the crystallinity of the CNT, the fine pore diameter control layer may get into the CNT through, for example, a defect. With this, it is possible to further increase the contact area to improve the adhesive strength.

It is preferable that the temperature of the heat treatment be equal to or higher than the temperature of the synthesis of the CNT. It is not preferable that the temperature of the heat treatment be equal to or lower than the temperature of the synthesis of the CNT, since the fine pore diameter control layer changes in quality when synthesizing the CNT. Further, the material of the porous layer and the material of the fine pore diameter control layer are selected such that the melting point of the porous layer is higher than that of the fine pore diameter control layer. In addition, the temperature condition is used, in which the fine pore diameter control layer melts, but the porous layer does not melt. With this, the adhesion between the substrate and the CNT can be improved while maintaining the orientation of the CNT.

The shape of the fine pore diameter control layer surrounding one end of the CNT is not limited to the shape shown in FIG. 7(b). Any shape can be used as long as the contact area between the CNT and the fine pore diameter control layer increases by the heat treatment. Moreover, even if the porous layer changes in shape instead of the fine pore diameter control layer, the object of the present embodiment can be achieved. With this, a part of the orientations of the CNTs may be lost, but further stronger adhesion can be realized.

Hereinafter, Example regarding the present embodiment will be explained.

Example 3

Used as the substrate is an electrically conductive Si substrate. A surface direction of the Si substrate is indicated by (100), and the Si substrate has a thickness of 400 μm. The Si substrate is doped with B, and shows p-type electrical conductivity. The resistivity is 1 Ω·cm or less. The substrate is cleaved into 1 cm square pieces, and respective substrates are subjected to the organic cleaning. As the organic cleaning, the acetone ultrasound cleaning is carried out for five minutes, and the ethanol ultrasound cleaning is carried out for five minutes. Then, the ultrasound cleaning using the super pure water is carried out for five minutes. After the super pure water cleaning, the $N_2$ blow is carried out to dry the substrates.

The substrate subjected to the cleaning is set in the EB deposition device, and subjected to the EB deposition such that a layer made of Al is formed to have a thickness of 100 nm. The degree of vacuum before the deposition is 1E-5Pa. The deposition rate is 1 angstrom/s. The deposition thickness and the deposition rate are monitored by using the crystal resonator of the vacuum deposition device.

After the deposition of Al, the substrate is taken out and subjected to the anodic oxidation. The fine pore diameter measured at this time is 10 nm. The depth of the fine pore is 100 nm.

The substrate subjected to the anodic oxidation is set in the EB deposition device, and subjected to the EB deposition such that a layer made of Cu is formed as the fine pore diameter control layer to have a thickness of 4 nm. In Example 3, Cu is used to change its shape in the heat treatment step. The degree of vacuum before the deposition is 1E-5Pa. The deposition rate of Cu is 1 angstrom/s. The deposition thickness and the deposition rate are monitored by using the crystal resonator of the vacuum deposition device. The fine pore diameter measured by the FE-SEM after the deposition of Cu is 2 nm.

After the deposition of Cu, the substrate is again set in the vacuum deposition device, and subjected to the EB deposition such that a layer made of Fe as the catalyst material is formed to have a thickness of 1 nm. The degree of vacuum before the deposition is 1E-5Pa. The deposition rate of Fe is 0.1 angstrom/s. After the deposition of Fe, the substrate is subjected to the heat treatment in a vacuum at 300° C. for 30 minutes. With this, the catalyst particle can be supported in the fine pore defined by Cu that is the fine pore diameter control layer. The diameter of the catalyst measured by the FE-SEM is 2 nm.

The nanostructure is manufactured by the above steps, and the CNT is then synthesized. The thermal CVD is used to synthesize the CNT. Used as a reactant gas is $C_2H_4$, and used as a carrier gas is Ar ($H_2$: 3% dilution).

The manufactured nanostructure is set in a reactor, and vacuum drawing is carried out using a rotary pump and a turbo-molecular pump. The degree of ultimate vacuum is 1E-4Pa. The pumps are stopped in this state, and Ar ($H_2$: 3% dilution) that is the carrier gas is supplied. The flow rate of Ar is 1,000 ccm. When Ar is supplied and the pressure of the reactor becomes the atmospheric pressure, 100 ccm of $C_2H_4$ that is the carbon source is supplied while maintaining the atmospheric pressure in the reactor, and the heat treatment starts. The reaction temperature is 750° C., and the synthesis is carried out for 30 minutes. With this, the CNT having a length of 20 μm can be synthesized. When a part of the synthesized CNTs are measured by Raman measurement, an RBM peak is observed. Thus, the synthesis of the single-wall CNT is confirmed. In addition, by TEM observation, it can be confirmed that the single-wall CNT having a diameter of 2 nm is synthesized. It is found from the above results that the nanostructure of the present invention is suitable for the synthesis of the CNT.

Next, the heat treatment is carried out. The heat treatment is carried out in a vacuum at 1,000° C. for 30 minutes. With this, Cu that is the fine pore diameter control layer is melted, and the fine pore diameter control layer changes in shape so as to surround one end of the CNT. At this time, anodically-oxidized Al that is the porous layer does not change in quality. This increases the contact area between the substrate including the fine pore diameter control layer and the CNT to improve the joint strength therebetween while maintaining the orientation of the CNT.

Example 4

Used as the substrate was the electrically conductive Si substrate. The substrate was cleaved into about 1 cm square pieces, and the anodic oxidation was carried out to locally form the porous layer. According to the observation of the substrate after the anodic oxidation, the center portion of the substrate was locally anodically oxidized in a circular shape. The anodic oxidation can be carried out using generally known conditions. In Example 4, the current density of the anodic oxidation was set to 20 μA/cm$^2$.

According to the observation of the upper surface of the substrate after the anodic oxidation by SEM, the formation of the porous layer having a large number of fine pores was confirmed. It has been found from our experiment that the fine pore diameter is about 5 to 30 nm at the time of the anodic oxidation using the current density of 20 μA/cm$^2$. According to the observation of the cross section of the substrate after the anodic oxidation by the SEM, the depth of the fine pore of the anodically oxidized porous layer was about 1.5 μm. The porous layer was formed so as not to almost deform in the subsequent CNT synthesis and the heat treatment step.

The substrate subjected to the anodic oxidation was cleaved into four pieces, and the substrates were then set in the EB deposition device and subjected to the EB deposition such that a layer made of Al was formed as the fine pore diameter control layer to have a thickness of 10 nm. To synthesize the carbon nanotube at 620° C. in Example 4, Al having the melting point of 660° C. which is 620° C. or higher was adopted as the material of the fine pore diameter control layer. The deposition rate was 1 angstrom/s. The deposition thickness and the deposition rate were monitored by using the crystal resonator of the vacuum deposition device.

After the deposition of Al that is the fine pore diameter control layer, Fe that is the catalyst was deposited by the EB deposition device to have a thickness of 0.5 nm. The deposition rate was 1 angstrom/s.

The substrate on which the catalyst was formed was taken out, and the carbon nanotube was formed. The carbon nanotube was formed by using microwave plasma CVD. Used as the reactant gas was $CH_4$(3N), and used as the carrier gas was $H_2$(6N) that is the reducing gas. 15 ccm of $CH_4$ and 40 ccm of H₂ were supplied, and a chamber pressure at the time of the synthesis was 20 Torr. The temperature of the substrate at the time of the synthesis was 620° C., and the synthesis was carried out for 30 minutes.

Next, the heat treatment was carried out without exposure to the atmosphere. The heat treatment was carried out such that after the synthesis of the CNT, the temperature of the substrate was increased to 670° C., maintained for five minutes, and decreased. In addition, the heat treatment was carried out at 20 Torr in the atmosphere of H₂ that is the reducing gas.

FIG. 8 are SEM pictures each showing the substrate obtained after the CNT synthesis and the heat treatment. FIG. 8-1 is a SEM picture which is a side view of the CNT formed at a portion where the porous layer exists, and is taken at a magnification of 10,000 times. FIG. 8-2 is a SEM picture which is a side view of the CNT formed at a portion where the porous layer does not exist, and is taken at a magnification of 10,000 times. In FIG. 8-1, a lowermost layer is the substrate, an intermediate layer is the porous layer, and an uppermost layer is a CNT layer. In FIG. 8-2, a lower layer is the substrate, and an upper layer is the CNT layer. It was found from both states of FIG. 8 that the carbon nanotube was formed to extend in a vertical direction while one end thereof was being fixed to the porous layer or the substrate. The thickness of the CNT was about 150 μm.

Next, a peeling test was carried out. As the peeling test, a contact test using tweezers and a peeling test using a tape are carried out. After the contact test using the tweezers, the CNT peeled off the portion where the porous layer does not exist, but did not peel off the portion where the porous layer exists. Moreover, it was found from the peeling test using the tape that the degree of peeling of the CNT off the portion where the porous layer exist was smaller than the degree of peeling of the CNT off the portion where the porous layer does not exist.

To further clearly explain the above, FIG. 9 are SEM pictures each showing an upper view of the vicinity of an interface between a portion subjected to the anodic oxidation and a portion not subjected to the anodic oxidation. The picture of FIG. 9-1 is taken at a magnification of 40 times, and the picture of FIG. 9-2 is taken at a magnification of 500 times. In FIG. 9-1, a broken line denotes the interface between the portion subjected to the anodic oxidation and the portion not subjected to the anodic oxidation. A portion above the broken line is the portion subjected to the anodic oxidation, i.e., the portion where the porous layer exists. A portion under the broken line is the portion not subjected to the anodic oxidation, i.e., the portion where the porous layer does not exist. A dark gray portion is a portion where the CNT did not peel off and remained, and a light gray portion is a portion where the CNT peeled off. FIG. 9-2 is an enlarged view of a portion surrounded by a square shown in FIG. 9-1. It was found from FIG. 9 that a part of the CNT peeled off the portion which is subjected to the anodic oxidation and where the porous layer exists, but the degree of peeling of the CNT off this portion was smaller than the degree of peeling of the CNT off the portion where the porous layer does not exist.

FIG. 10 are SEM pictures each showing a side view of the substrate obtained after the peeling test using the tape. The SEM pictures of FIG. 10 show substantially the same portion as the SEM pictures of FIG. 8. FIG. 10-1 is a SEM picture which is a side view of the portion where the porous layer exists, and is taken after the peeling test at a magnification of 10,000 times. FIG. 10-2 is a SEM picture which is a side view of the portion where the porous layer does not exist, and is taken after the peeling test at a magnification of 10,000 times. It was confirmed from FIG. 10-1 that at the portion where the porous layer exists, the orientation of the CNT in the vertical direction was not lost even after the peeling test using the tape, and the CNT was neatly oriented. In contrast, it was found from FIG. 10-2 that at the portion where the porous layer does not exist, the CNT peeled off.

FIG. 11 shows a schematic diagram (right side: the present invention) of a case where the CNT is formed at the portion where the porous layer exists and a schematic diagram (left side: comparison) of a case where the CNT is formed at the portion where the porous layer does not exist. The fine pore diameter control layer may be deposited even at the portion where the porous layer does not exist, and the fine pore diameter control layer may be melted by the heat treatment. Therefore, even in the case where the CNT is formed at the portion of where the porous layer does not exist, there is a slight effect of fixation by the melting of the fine pore diameter control layer. However, the Examples of the present invention have shown that this slight effect is much lower than the effect of fixation of the present invention. In the present invention, the CNT is formed to extend from the fine pore of the porous layer, and is fixed by the fine pore diameter control layer. Therefore, as shown in FIG. 11, the contact area between the CNT and the fine pore diameter control layer may increase, and the effect of fixation may improve.

By increasing the thickness of the fine pore diameter control layer at the portion where the porous layer does not exist or further increasing the temperature of the heat treatment at the time of the fixation, the strength of fixation may be able to be increased. However, in this case, the orientation of the CNT in the vertical direction may not be maintained by the melting of the fine pore diameter control layer increased in thickness.

INDUSTRIAL APPLICABILITY

The present invention can effectively synthesize the thin-diameter CNT on the substrate, and is especially suitable for the synthesis of the single-wall CNT. In addition, the present invention can increase the joint strength between the substrate and the CNT while controlling the orientation of the CNT. For example, the nanostructure in which one end of the CNT is fixed on the substrate can be utilized as a hydrogen storage material, an electrode material, such as a Li battery, a fuel cell, or an electric double layer capacitor material, an energy device using these materials, an electron-emissive element material, or the like.

BRIEF DESCRIPTION OF THE DRAWINGS

FIG. 8 are SEM pictures each showing a side view of the CNT on the substrate subjected to the CNT synthesis and the heat treatment.

FIG. 9 are SEM pictures each showing an upper view of the vicinity of an interface between the portion subjected to the anodic oxidation and the portion not subjected to the anodic oxidation.

FIG. 10 are SEM pictures each showing a side view of the substrate obtained after the peeling test using the tape.

Figure 1:
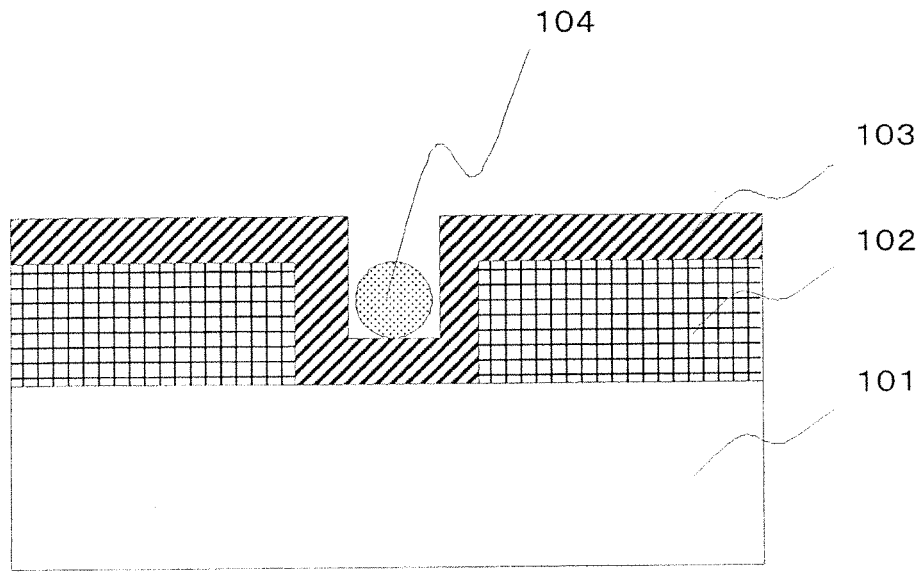
FIG. 1 are conceptual diagrams for comparing the present invention with the prior art.
Figure 1:
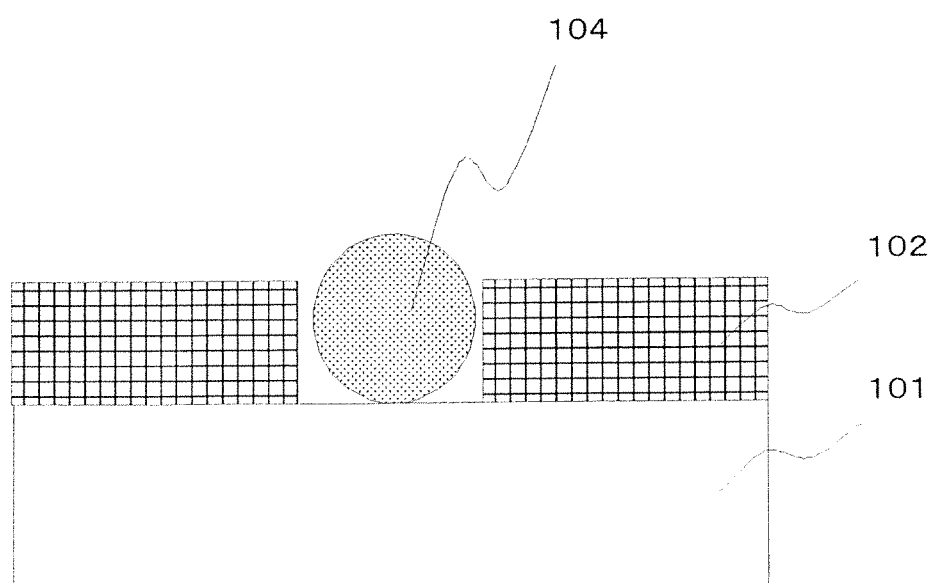
Figure 2:
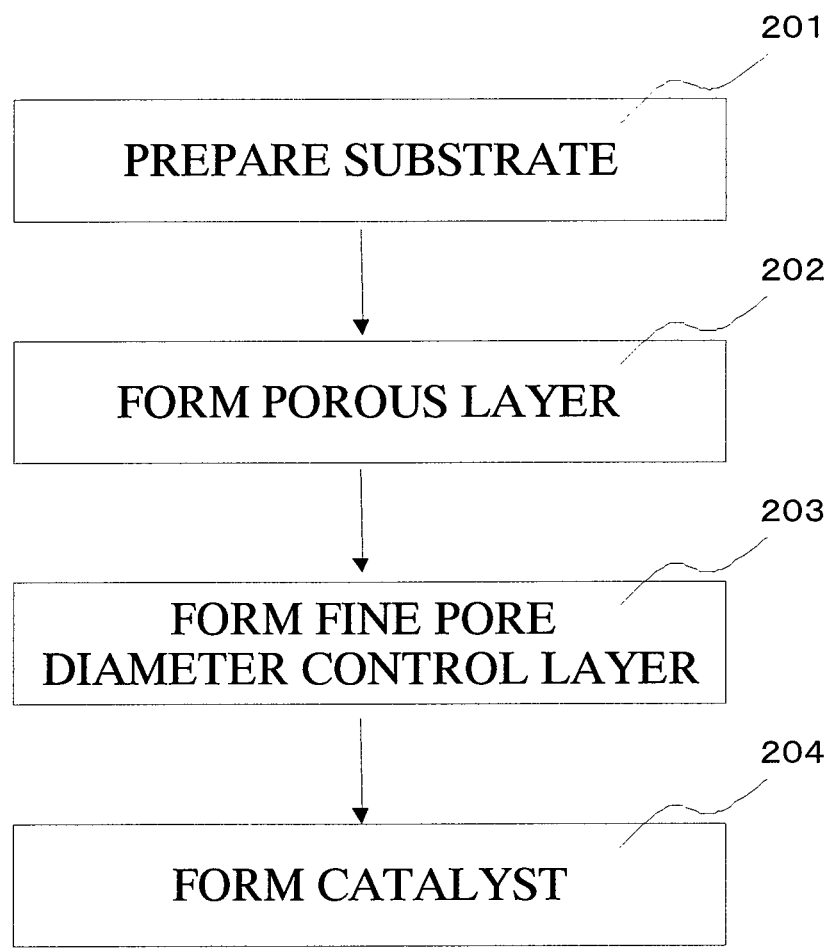
FIG. 2 is a diagram showing steps (before a step of forming the CNT) of a manufacturing method of Embodiment 1 of the present invention.
Figure 3:
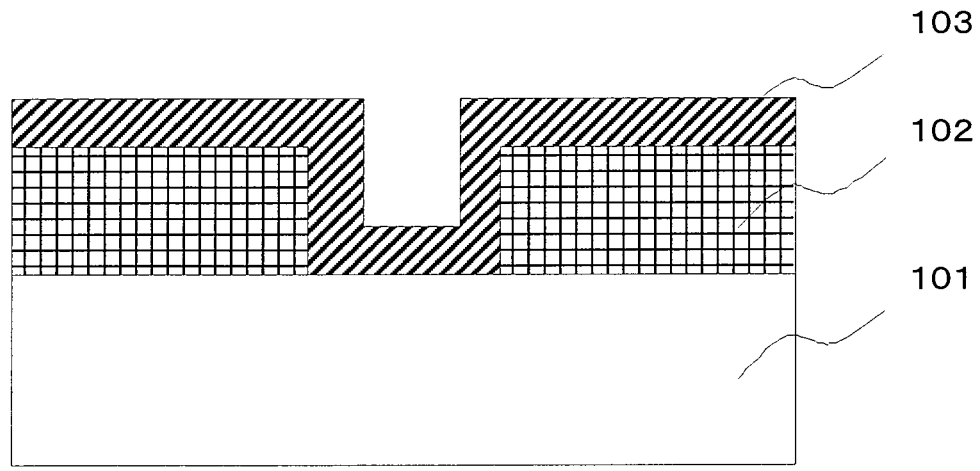
FIG. 3 are conceptual diagrams showing the shape of the fine pore diameter control layer in the present invention.
Figure 3:
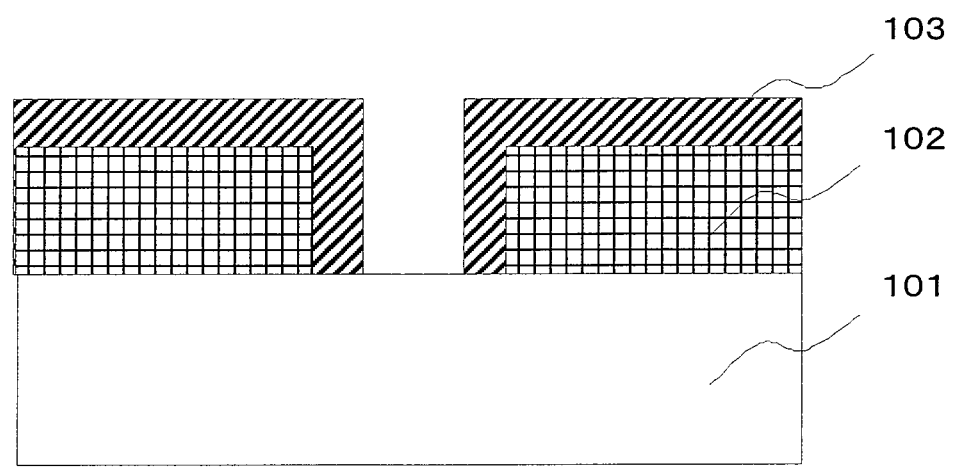
Figure 4:
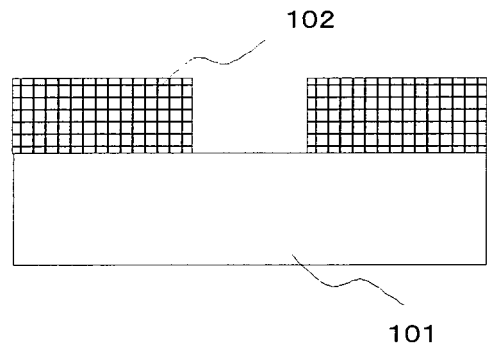
FIG. 4 are conceptual diagrams showing a difference of the formation of the catalyst due to a difference of the shape of the fine pore of the porous layer in the present invention.
Figure 4:
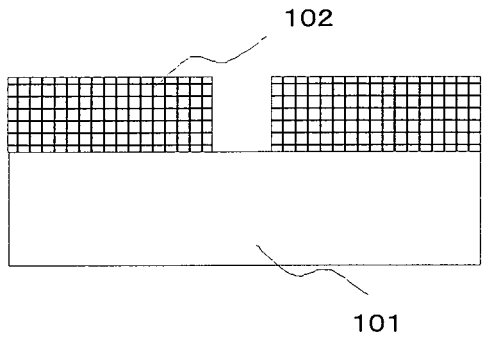
Figure 4:
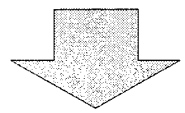
Figure 4:
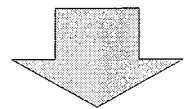
Figure 4:
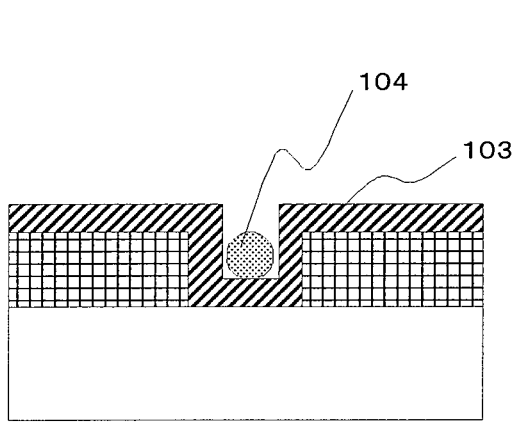
Figure 4:
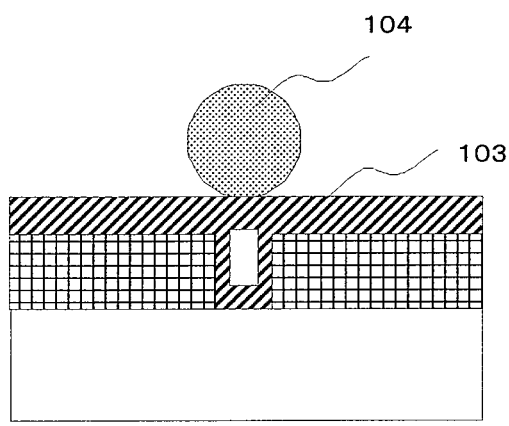
Figure 5:
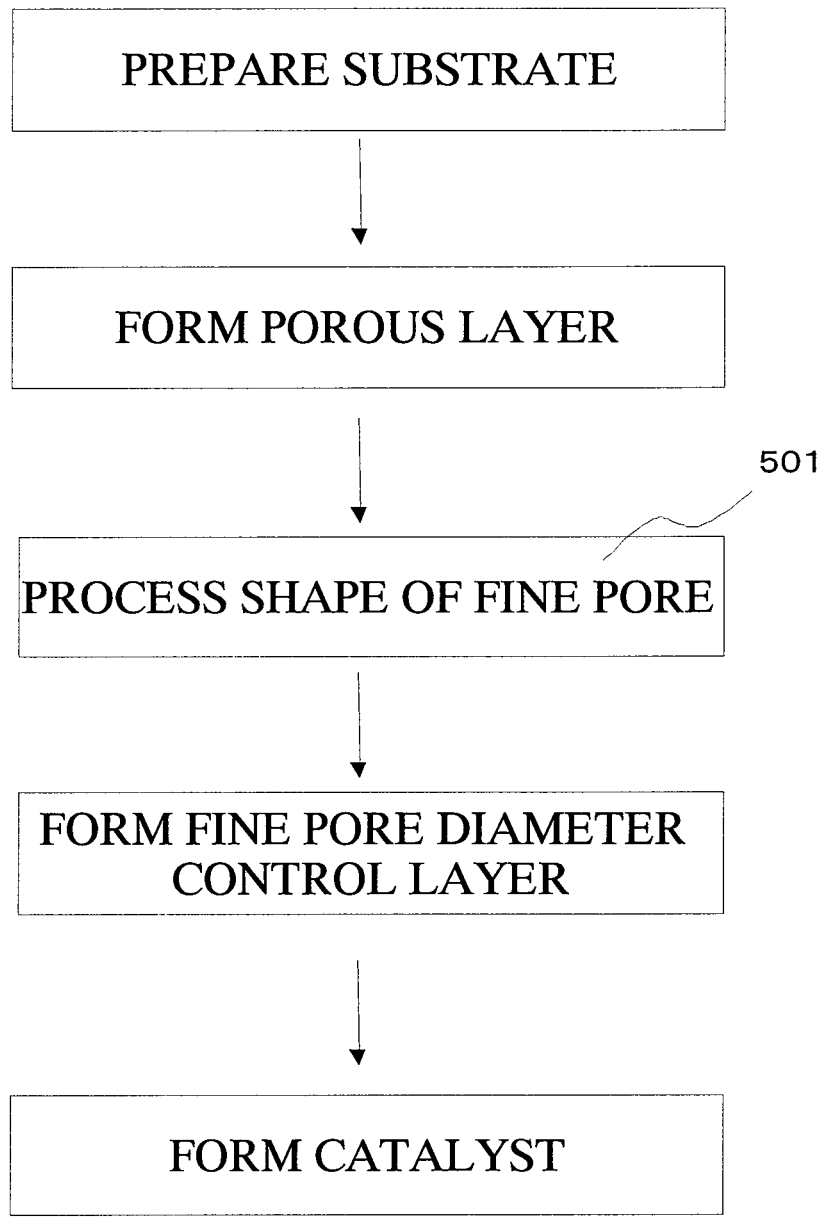
FIG. 5 is a diagram showing the steps (before the step of forming the CNT) of the manufacturing method of Embodiment 2 of the present invention.
Figure 6:
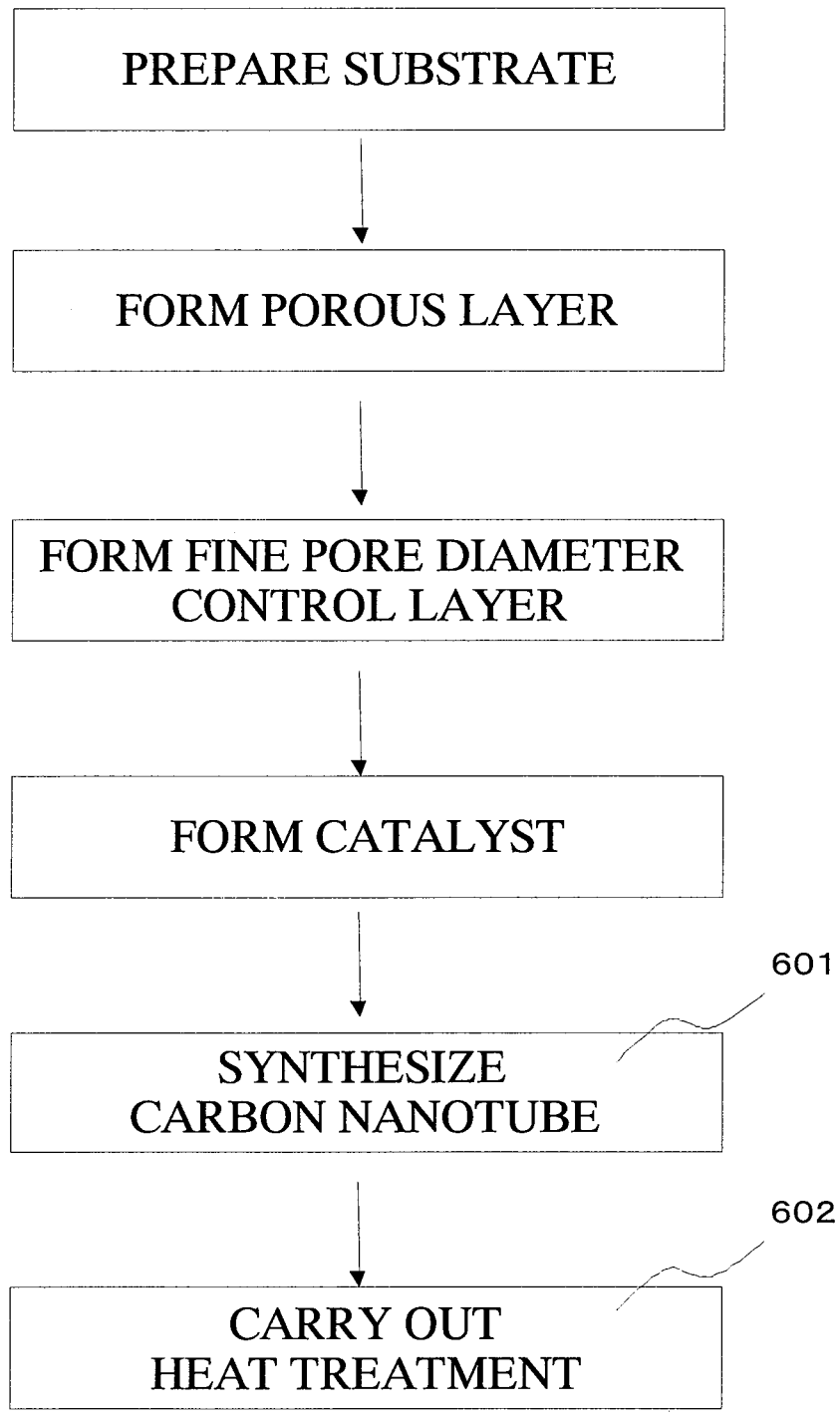
FIG. 6 is a diagram showing the steps of the manufacturing method of Embodiment 3 of the present invention.
Figure 7:
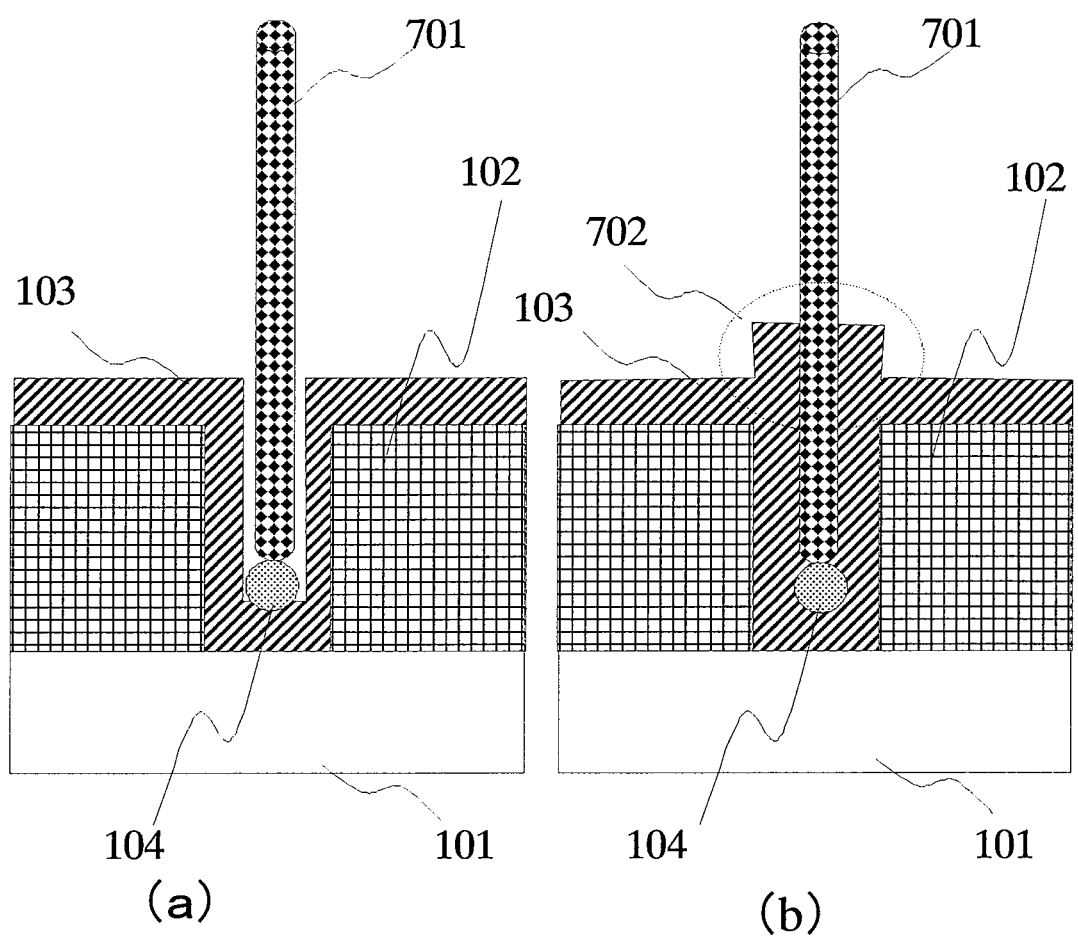
FIG. 7 are conceptual diagrams showing the difference of the shape of the fine pore diameter control layer between before and after the heat treatment in the present invention.
Figure 11:
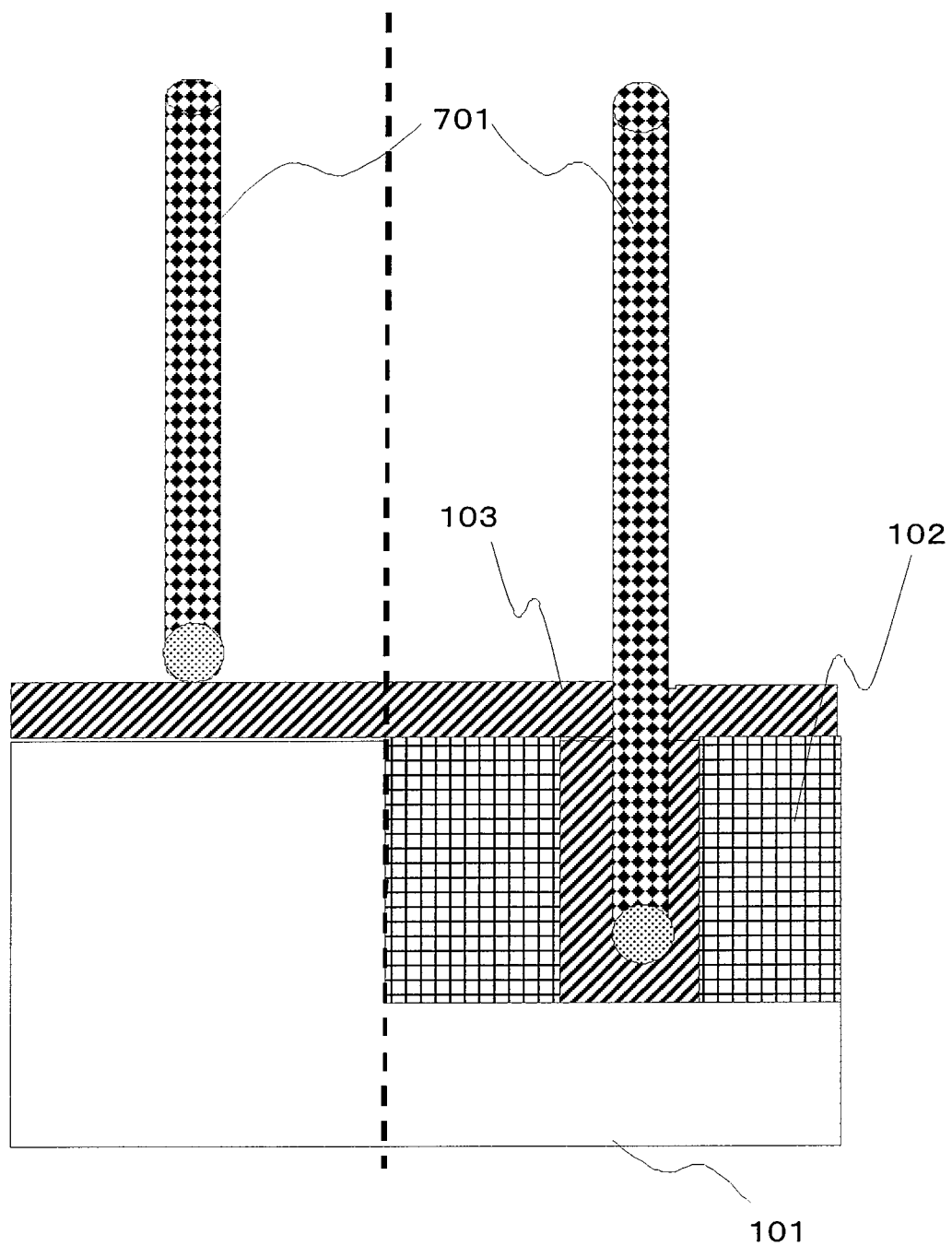
FIG. 11 shows a schematic diagram of a case where the CNT is formed at the portion where the porous layer exists and a schematic diagram of a case where the CNT is formed at the portion where the porous layer does not exist.

EXPLANATION OF REFERENCE NUMBERS 101 substrate
102 porous layer
103 fine pore diameter control layer
104 catalyst
201 substrate preparing step
202 porous layer forming step
203 fine pore diameter control layer forming step
204 catalyst forming step
501 fine pore shape processing step
601 carbon nanotube synthesizing step
602 heat treatment step
701 carbon nanotube
702 fine pore diameter control layer rising along periphery of carbon nanotube

The invention claimed is:

1. A nanostructure comprising:
a substrate;
a porous layer formed on the substrate having a fine pore;
a fine pore diameter control layer including a conductive material and formed on the porous layer;
a carbon nanotube extending from the fine pore defined by the fine pore diameter control layer; and
a catalyst located at a tip end of the carbon nanotube or supported by a bottom portion of the fine pore, wherein:
the conductive material of the fine pore diameter control layer is different from a material of the catalyst, and
one end of the carbon nanotube is fixed by the fine pore diameter control layer.

2. The nanostructure according to claim 1, wherein the substrate is electrically conductive.

3. The nanostructure according to claim 1 or 2, wherein the fine pore of the porous layer is oriented in a predetermined direction with respect to the substrate.

4. The nanostructure according to claim 3, wherein the predetermined direction is perpendicular to the substrate.

5. The nanostructure according to claim 1, wherein the porous layer is an anode oxide film.

6. The nanostructure according to claim 1, wherein a melting point of the porous layer is higher than a melting point of the fine pore diameter control layer.

7. The nanostructure according to claim 6, wherein the melting point of the fine pore diameter control layer is 600° C. or higher.

8. The nanostructure according to claim 1, wherein a degree of oxidation of the fine pore diameter control layer located at a lower portion of a contact portion between the fine pore diameter control layer and the carbon nanotube is lower than a degree of oxidation of the fine pore diameter control layer located at an upper portion of the contact portion.

9. The nanostructure according to claim 1, wherein a material constituting the fine pore diameter control layer penetrates into the carbon nanotube.

10. The nanostructure according to claim 1, wherein:
the fine pore diameter control layer covers an entire inside portion of the fine pore so as to cover the substrate, and
the catalyst is disposed on the fine pore diameter control layer covering the substrate.

11. The nanostructure according to claim 1, wherein the catalyst is disposed on the substrate in the fine pore.

12. The nanostructure according to claim 1, wherein the substrate and the porous layer are integrated as one body.

13. The nanostructure according to claim 1, wherein the substrate is made of aluminum and the porous layer is anode-oxidized aluminum.

14. The nanostructure according to claim 1, wherein the fine pore diameter control layer rises along a periphery of the carbon nanotube.

15. The nanostructure according to claim 1, wherein the conductive material includes Cu or Pt.

* * * * *